US009832582B2

(12) United States Patent
Chen et al.

(10) Patent No.: US 9,832,582 B2
(45) Date of Patent: Nov. 28, 2017

(54) SOUND EFFECT CONTROL METHOD AND APPARATUS

(71) Applicant: Huawei Device Co., Ltd., Shenzhen (CN)

(72) Inventors: Fushun Chen, Beijing (CN); Jianwei Zhu, Beijing (CN); Yanhui Ren, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 14/901,854

(22) PCT Filed: Sep. 1, 2014

(86) PCT No.: PCT/CN2014/085648
§ 371 (c)(1),
(2) Date: Dec. 29, 2015

(87) PCT Pub. No.: WO2015/035862
PCT Pub. Date: Mar. 19, 2015

(65) Prior Publication Data
US 2016/0373872 A1 Dec. 22, 2016

(30) Foreign Application Priority Data

Sep. 16, 2013 (CN) .......................... 2013 1 0422970

(51) Int. Cl.
*H04R 29/00* (2006.01)
*H04M 1/60* (2006.01)
(Continued)

(52) U.S. Cl.
CPC .......... *H04R 29/004* (2013.01); *H04M 1/605* (2013.01); *H04M 1/6016* (2013.01);
(Continued)

(58) Field of Classification Search
CPC ................ H04R 29/004; H04R 29/001; H04R 2430/01; H04M 1/6016; H04M 3/002; H04M 1/605; H04M 9/082
See application file for complete search history.

(56) References Cited

U.S. PATENT DOCUMENTS 8,374,362 B2 * 2/2013 Ramakrishnan ....... H04R 3/005
381/122
2003/0099345 A1 5/2003 Gartner et al.
(Continued)

FOREIGN PATENT DOCUMENTS

CN 1956480 A 5/2007
CN 101179294 A 5/2008
(Continued)

*Primary Examiner* — Regina N Holder

(57) ABSTRACT

The present invention relates to a sound effect control method and apparatus, where the method includes: when a hands-free call is performed for a mobile terminal, detecting whether a hands-free call channel of the mobile terminal is shielded; and adjusting a configuration of the hands-free call channel of the mobile terminal and/or outputting an alarm signal to inform a user that the hands-free call channel is shielded, when it is detected that the hands-free call channel of the mobile terminal is shielded. According to the method, when a hands-free call is performed for a mobile terminal, whether a hands-free call channel of the mobile terminal is shielded is detected; when it is shielded, a configuration of the hands-free call channel of the mobile terminal is adjusted and/or an alarm signal is output, which can effectively improve quality of the hands-free call of the mobile terminal.

15 Claims, 6 Drawing Sheets

(51) Int. Cl.
*H04M 3/00* (2006.01)
*H04M 9/08* (2006.01)

(52) U.S. Cl.
CPC ........... *H04M 3/002* (2013.01); *H04M 9/082* (2013.01); *H04R 29/001* (2013.01); *H04R 2430/01* (2013.01); *H04R 2499/11* (2013.01)

(56) References Cited

U.S. PATENT DOCUMENTS

| | | |
|---|---|---|
| 2004/0165735 A1 | 8/2004 | Opitz |
| 2009/0196429 A1 | 8/2009 | Ramakrishnan et al. |
| 2009/0312075 A1 | 12/2009 | Kimbrell |
| 2010/0098261 A1 | 4/2010 | Norhammar et al. |
| 2011/0317848 A1 | 12/2011 | Ivanov et al. |

FOREIGN PATENT DOCUMENTS

| | | |
|---|---|---|
| CN | 101272414 A | 9/2008 |
| CN | 101719962 A | 6/2010 |
| CN | 201608754 U | 10/2010 |
| CN | 101911730 A | 12/2010 |
| CN | 102082844 A | 6/2011 |
| CN | 202127439 U | 1/2012 |
| CN | 102572086 A | 7/2012 |
| CN | 202340252 U | 7/2012 |
| CN | 103501375 A | 1/2014 |
| EP | 1 244 279 A1 | 9/2002 |
| EP | 2 429 155 A1 | 3/2012 |

\* cited by examiner

SOUND EFFECT CONTROL METHOD AND APPARATUS

CROSS-REFERENCE TO RELATED APPLICATIONS

This application claims priority under 35 U.S.C. §365 to International Application No. PCT/CN2014/085648, filed on Sep. 1, 2014. International Application No. PCT/CN2014/085648 claims priority under 35 U.S.C. §365 and/or 35 U.S.C. §119 (a) to Chinese Patent Application No. 201310422970.6, filed on Sep. 16, 2013, both of which are hereby incorporated by reference in their entireties.

TECHNICAL FIELD

The present invention relates to electronic communications technologies, and in particular, to a sound effect control method and apparatus.

BACKGROUND

When using a mobile phone to perform a call, a user may enable hands-free to perform the call. In an existing echo suppression solution, an effect of a hands-free call can be improved, thereby resolving a voice problem that exists when a mobile phone is normally used to perform a hands-free call.

However, when a hands-free call is performed for a mobile phone, a microphone (Mic) or a speaker (Speaker) of the mobile phone may be shielded. For example, the microphone or the speaker of the mobile phone may be shielded by a hand of a user, or may be shielded by another object; or when the mobile phone is placed on a tabletop, the microphone located on the back of the mobile phone is shielded.

An existing hands-free sound effect solution is an echo suppression solution that is mainly for a scenario in which a user normally holds a mobile phone by hand, but cannot be applicable to the foregoing case in which the microphone or the speaker is shielded. As a result, when a hands-free call is performed for a mobile phone and a microphone or a speaker is shielded, an echo is increased and a sound effect is deteriorated, thereby greatly affecting call quality.

SUMMARY

In view of this, a technical problem to be resolved in the present invention is that when a hands-free call is performed for a mobile phone and a microphone or a speaker is shielded, call quality deteriorates.

To achieve the foregoing objective, according to a first aspect, the present invention provides a sound effect control method, including:

when a hands-free call is performed for a mobile terminal, detecting whether a hands-free call channel of the mobile terminal is shielded; and adjusting a configuration of the hands-free call channel of the mobile terminal and/or outputting an alarm signal to inform a user that the hands-free call channel is shielded, when it is detected that the hands-free call channel of the mobile terminal is shielded.

With reference to the first aspect, in a first possible implementation manner, the detecting whether a hands-free call channel of the mobile terminal is shielded includes:

detecting whether a microphone of the mobile terminal is shielded; and/or detecting whether a speaker of the mobile terminal is shielded.

With reference to the first possible implementation manner of the first aspect, in a second possible implementation manner, the detecting whether a microphone of the mobile terminal is shielded includes:

detecting a variation in sound pressure of the microphone; and when it is detected that $F_1-F_2 \geq F_3$, determining that the microphone is shielded, where $F_1$ represents sound pressure of the microphone during a first time period, $F_2$ represents sound pressure of the microphone during a second time period, and the first time period is prior to the second time period; $F_3$ represents a first threshold.

With reference to the first possible implementation manner of the first aspect or the second possible implementation manner of the first aspect, in a third possible implementation manner, the adjusting a configuration of the hands-free call channel of the mobile terminal when it is detected that the hands-free call channel of the mobile terminal is shielded includes: adjusting the configuration of the hands-free call channel of the mobile terminal when it is detected that the microphone is shielded, where the adjusting the configuration of the hands-free call channel of the mobile terminal includes any one or more of the following:

improving a gain of the microphone;

adjusting a filter parameter, an automatic gain control parameter, and/or an echo cancellation parameter that are of the hands-free call channel of the mobile terminal, to reduce a noise floor, a degree of distortion, and/or an echo of a sound picked up by the microphone; and enabling another microphone of the mobile terminal and using the another microphone as a microphone for the hands-free call.

With reference to any one of the first possible implementation manner of the first aspect to the third possible implementation manner of the first aspect, in a fourth possible implementation manner, the detecting whether a speaker of the mobile terminal is shielded includes:

detecting a variation in acoustic impedance of the speaker; and when $R_2-R_1 \geq R_3$, determining that the speaker is shielded, where $R_1$ represents acoustic impedance of the speaker at a first time, $R_2$ represents acoustic impedance of the speaker at a current time, and the first time is prior to the current time; $R_3$ represents a second threshold;

or, detecting an amplitude $H_1$ of a first sound and an amplitude $H_2$ of a second sound; and when $H_1-H_2 \geq H_3$ and it is determined that the microphone is not shielded, determining that the speaker is shielded, where $H_3$ represents a third threshold;

or, detecting a transmission delay T of a first sound relative to a second sound; and when $T \leq T_1$, determining that the speaker is shielded, where $T_1$ represents a fourth threshold; where the first sound is a sound that is picked up inside the mobile terminal and to be output by the speaker, and the second sound is a sound that is picked up by the microphone and that is obtained after the first sound is output by the speaker.

With reference to any one of the first possible implementation manner of the first aspect to the fourth possible implementation manner of the first aspect, in a fifth possible implementation manner, the adjusting a configuration of the hands-free call channel of the mobile terminal when it is detected that the hands-free call channel of the mobile terminal is shielded includes: adjusting the configuration of the hands-free call channel of the mobile terminal when it is detected that the speaker is shielded, where the adjusting the configuration of the hands-free call channel of the mobile terminal includes any one or more of the following:

raising volume of the speaker;

adjusting a filter parameter, an automatic gain control parameter, and/or an echo cancellation parameter that are of the hands-free call channel of the mobile terminal, to reduce a noise floor, a degree of distortion, and/or an echo of a sound output by the speaker; and enabling another speaker of the mobile terminal and using the another speaker as a speaker for the hands-free call.

According a second aspect, the present invention provides a sound effect control apparatus, including:

a detecting unit, configured to: when a hands-free call is performed for a mobile terminal, detect whether a hands-free call channel of the mobile terminal is shielded; and a control unit, which is connected to the detecting unit and is configured to: when the detecting unit detects that the hands-free call channel of the mobile terminal is shielded, adjust a configuration of the hands-free call channel of the mobile terminal and/or output an alarm signal to inform a user that the hands-free call channel is shielded.

With reference to the second aspect, in a first possible implementation manner, the detecting unit includes:

a microphone detecting subunit, configured to detect whether a microphone of the mobile terminal is shielded; and a speaker detecting subunit, configured to detect whether a speaker of the mobile terminal is shielded.

With reference to the first possible implementation manner of the second aspect, in a second possible implementation manner, the microphone detecting subunit specifically includes:

a sound pressure detecting module, configured to detect a variation in sound pressure of the microphone; and a first determining module, which is connected to the sound pressure detecting module and is configured to: when the sound pressure detecting module detects that $F_1-F_2 \geq F_3$, determine that the microphone is shielded, where $F_1$ represents sound pressure of the microphone during a first time period, $F_2$ represents sound pressure of the microphone during a second time period, and the first time period is prior to the second time period; $F_3$ represents a first threshold.

With reference to the first possible implementation manner of the second aspect or the second possible implementation manner of the second aspect, in a third possible implementation manner, the control unit is configured to: when the microphone detecting subunit detects that the microphone is shielded, perform any one or more of the following operations:

improving a gain of the microphone;

adjusting a filter parameter, an automatic gain control parameter, and/or an echo cancellation parameter that are of the hands-free call channel of the mobile terminal, to reduce a noise floor, a degree of distortion, and/or an echo of a sound picked up by the microphone; and enabling another microphone of the mobile terminal and using the another microphone as a microphone for the hands-free call.

With reference to any one of the first possible implementation manner of the second aspect to the third possible implementation manner of the second aspect, in a fourth possible implementation manner, the speaker detecting subunit specifically includes: an acoustic impedance detecting module and a second determining module; and/or an amplitude detecting module and a third determining module; and/or a delay detecting module and a fourth determining module; where the acoustic impedance detecting module is configured to detect a variation in acoustic impedance of the speaker;

the second determining module is connected to the acoustic impedance detecting module and is configured to: when $R_2-R_1 \geq R_3$, determine that the speaker is shielded, where $R_1$ represents acoustic impedance of the speaker at a first time, $R_2$ represents acoustic impedance of the speaker at a current time, and the first time is prior to the current time; $R_3$ represents a second threshold;

the amplitude detecting module is configured to detect an amplitude $H_1$ of a first sound and an amplitude $H_2$ of a second sound;

the third determining module is connected to the amplitude detecting module and the microphone detecting subunit, and is configured to: when the amplitude detecting module detects that $H_1-H_2 \geq H_3$ and the microphone detecting subunit determines that the microphone is not shielded, determine that the speaker is shielded, where $H_3$ represents a third threshold;

the delay detecting module is configured to detect a transmission delay T of the first sound relative to the second sound; and the fourth determining module is connected to the delay detecting module and is configured to: when $T \leq T_1$, determine that the speaker is shielded, where $T_1$ represents a fourth threshold; where the first sound is a sound that is picked up inside the mobile terminal and to be output by the speaker, and the second sound is a sound that is picked up by the microphone and that is obtained after the first sound is output by the speaker.

With reference to any one of the first possible implementation manner of the second aspect to the fourth possible implementation manner of the second aspect, in a fifth possible implementation manner, the control unit is configured to: when the speaker detecting subunit detects that the speaker is shielded, perform any one or more of the following operations:

raising volume of the speaker;

adjusting a filter parameter, an automatic gain control parameter, and/or an echo cancellation parameter that are of the hands-free call channel of the mobile terminal, to reduce a noise floor, a degree of distortion, and/or an echo of a sound output by the speaker; and enabling another speaker of the mobile terminal and using the another speaker as a speaker for the hands-free call.

According to the sound effect control method in embodiments, when a hands-free call is performed for a mobile terminal, whether a hands-free call channel of the mobile terminal is shielded is detected; when the hands-free call channel of the mobile terminal is shielded, a configuration of the hands-free call channel of the mobile terminal is adjusted and/or an alarm signal is output, which can effectively improve quality of the hands-free call of the mobile terminal.

Exemplary embodiments are described in detail with reference to accompanying drawings to make other features and aspects of the present invention clear.

BRIEF DESCRIPTION OF DRAWINGS

Accompanying drawings that is included in the specification and that constitutes a part of the specification, and the specification illustrate exemplary embodiments, features, and aspects of the present invention, and are used for explaining principles of the present invention.

DETAILED DESCRIPTION

Figure 1:
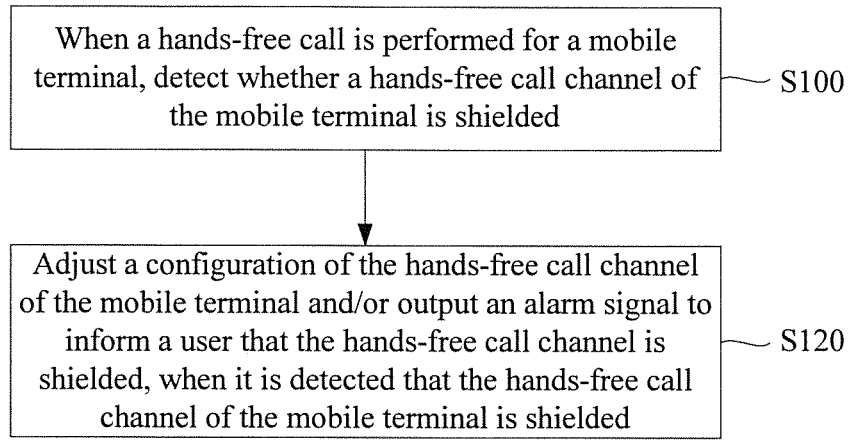
FIG. 1 is a flowchart of a sound effect control method according to Embodiment 1 of the present invention.

Various exemplary embodiments, features, and aspects of the present invention are described in detail in the following with reference to accompanying drawings. In the drawings, identical reference numerals denote elements that have an identical or similar function. Although various aspects of the embodiments are shown in the drawings, unless otherwise specified, the drawings are not necessarily drawn to scale.

The specific term "exemplary" herein means "used as an example, embodiment or illustrative". Any embodiment described for "exemplary" purposes is not necessarily explained as being superior or better than other embodiments.

In addition, to better describe the present invention, many details are described in the following specific implementation manners. A person skilled in the art shall understand that, the present invention can still be implemented without such details. In other instances, well-known methods, means, elements, and circuits are not described in detail, so as to highlight the theme of the present invention.

Embodiment 1

FIG. 1 is a flowchart of a sound effect control method according to Embodiment 1 of the present invention. As shown in FIG. 1, the sound effect control method may include:

Step S100: When a hands-free call is performed for a mobile terminal, detect whether a hands-free call channel of the mobile terminal is shielded.

Specifically, when a user uses a mobile terminal such as a mobile phone, a tablet, or a notebook computer to perform a hands-free call such as a hands-free voice call or a hands-free video call, the mobile terminal may detect whether a hands-free call channel of the mobile terminal is shielded. For example, when the user uses a mobile phone to perform a hands-free call, the mobile phone may detect whether a microphone of the mobile phone and/or a speaker of the mobile phone is shielded; for example, the microphone of the mobile phone is shielded by the user or a flat surface, or the speaker of the mobile phone is shielded by the user or a flat surface.

Step S120: Adjust a configuration of the hands-free call channel of the mobile terminal and/or output an alarm signal to inform a user that the hands-free call channel is shielded, when it is detected that the hands-free call channel of the mobile terminal is shielded.

Specifically, when the mobile terminal not only adjusts the configuration of the hands-free call channel of the mobile terminal but also outputs the alarm signal, the following cases may be included:

Case 1: When the mobile terminal detects that the hands-free call channel of the mobile terminal is shielded, the mobile terminal may output the alarm signal after adjusting the configuration of the hands-free call channel of the mobile terminal. After learning the alarm signal, the user may not remove the shield. In this case, a sound effect of the hands-free call can still be optimized even if the user does not remove the shield. The user may learn, according to the alarm signal, that measures have been taken for the mobile terminal to improve the sound effect of the current hands-free call, and user experience is favorable. In addition, the user may also remove the shield; in this case, the adjusted configuration of the call channel may be recovered, and the call recovers.

Case 2: When the mobile terminal detects that the hands-free call channel of the mobile terminal is shielded, the mobile terminal may output the alarm signal before adjusting the configuration of the hands-free call channel of the mobile terminal. In this case, if the user removes the shield, the call recovers; if the user does not remove the shield within a time period, the mobile terminal may adjust the configuration of the hands-free call channel of the mobile terminal and/or continue to output the alarm signal.

Case 3: When the mobile terminal detects that the hands-free call channel of the mobile terminal is shielded, the mobile terminal may output the alarm signal when adjusting the configuration of the hands-free call channel of the mobile terminal. In this case, if the user removes the shield, the call recovers; if the user does not remove the shield, the mobile terminal may continue to adjust the configuration of the hands-free call channel of the mobile terminal.

It should be noted that, the mobile terminal can still output the alarm signal even when the mobile terminal detects that the hands-free call channel of the mobile terminal is shielded; however, when the alarm signal is not output and only the configuration of the hands-free call channel is adjusted, impact on user experience due to excessive alarms can be avoided.

According to the sound effect control method in this embodiment, when a hands-free call is performed for a mobile terminal, whether a hands-free call channel of the mobile terminal is shielded is detected; when the hands-free call channel of the mobile terminal is shielded, a configuration of the hands-free call channel of the mobile terminal is adjusted and/or an alarm signal is output, which can effectively improve quality of the hands-free call of the mobile terminal.

Embodiment 2

Figure 2A:
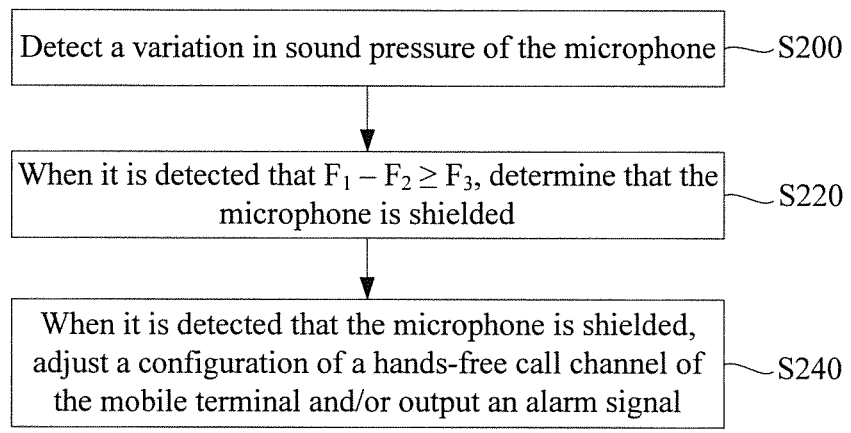
FIG. 2*a* is a flowchart of a sound effect control method according to Embodiment 2 of the present invention.

FIG. 2*a* is a flowchart of a sound effect control method according to Embodiment 2 of the present invention.

Step S100 in the foregoing Embodiment 1 may include: detecting whether a microphone of a mobile terminal is shielded. As shown in FIG. 2a, the method shown in FIG. 2a is mainly a method of detecting whether the microphone of the mobile terminal is shielded, where the method may include:

Step S200: Detect a variation in sound pressure of the microphone.

Step S220: When it is detected that $F_1-F_2 \geq F_3$, determine that the microphone is shielded, where $F_1$ represents sound pressure of the microphone during a first time period, $F_2$ represents sound pressure of the microphone during a second time period, and the first time period is prior to the second time period; $F_3$ represents a first threshold.

Specifically, the variation in the sound pressure of the microphone of the mobile terminal may be detected by using many methods. For example, the mobile terminal may first detect a voltage of the microphone, and then the sound pressure of the microphone is obtained through calculation according to a conversion relationship between the voltage of the microphone and the sound pressure of the microphone.

Figure 2B:
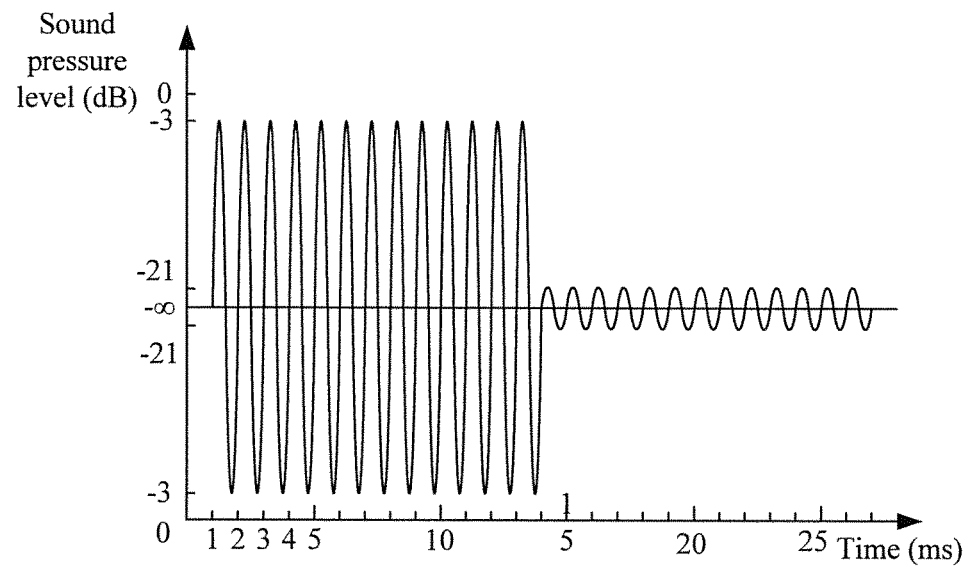
FIG. 2*b* is a sound pressure waveform diagram according to Embodiment 2 of the present invention.
Figure 2C:
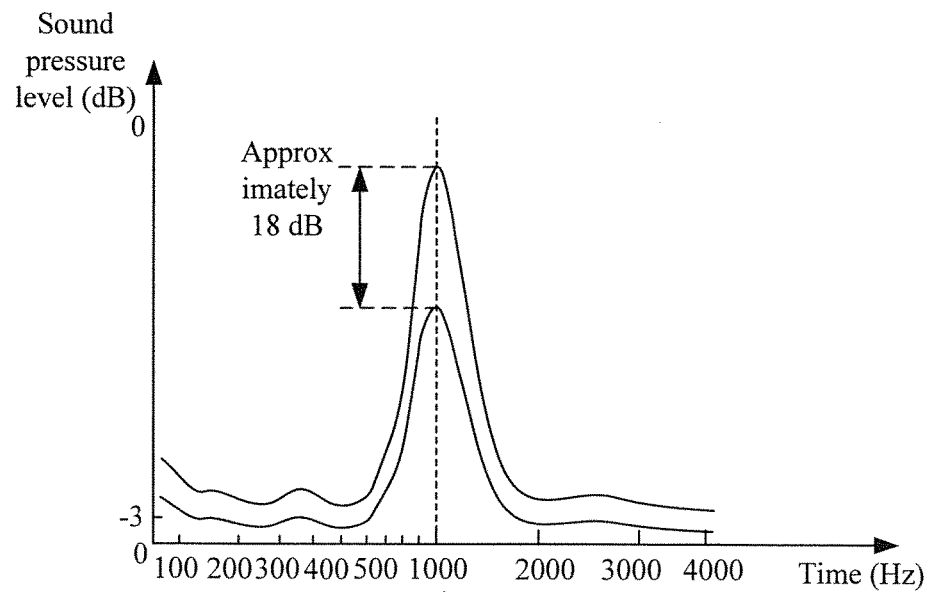
FIG. 2*c* is a spectrum analysis diagram corresponding to the sound pressure waveform diagram according to Embodiment 2 of the present invention.

For example, FIG. 2b is a sound pressure waveform diagram according to Embodiment 2 of the present invention, and FIG. 2c is a spectrum analysis diagram corresponding to the sound pressure waveform diagram. In FIG. 2b and FIG. 2c, the first threshold $F_3$ is 6 dB, and a voice source used for local speaking is 1 kHz 0 dB, that is, a sound pressure level (sound pressure level, SPL for short) of audible threshold sound pressure of a human body is 0 dB. In FIG. 2b, sound pressure detected during a time period from 1 millisecond (ms) to 14 ms is detected by the mobile terminal when the microphone of the mobile terminal is not shielded, and sound pressure detected during a time period from 14 ms to 27 ms is detected by the mobile terminal when the microphone of the mobile terminal is shielded (for example, when a finger blocks the microphone). As shown in FIG. 2b, the first time period is 13 ms, a start time of the first time period is 1 ms, and an end time of the first time period is 14 ms; the second time period is 13 ms, a start time of the second time period is 14 ms, and an end time of the second time period is 27 ms. It can be learned from FIG. 2b that, the mobile terminal may first detect that the sound pressure $F_1$ of the microphone of the mobile terminal during the first time period is −3 dB, and the sound pressure $F_2$ during the second time period is −21 dB. The mobile terminal may detect that $F_1-F_2$ is 18 dB and the value is greater than the first threshold 6 dB, that is, $F_1-F_2 \geq F_3$. Therefore, according to the sound effect control method in this embodiment, the mobile terminal may determine that the microphone of the mobile terminal is shielded during the second time period, which conforms with an actual situation. Likewise, in FIG. 2c, it can also be learned that a difference between the sound pressure $F_1$ during the first time period and the sound pressure $F_2$ during the second time period is approximately 18 dB and the value is greater than the first threshold 6 dB, which conforms with the actual situation.

Step S240: When it is detected that the microphone is shielded, adjust a configuration of a hands-free call channel of the mobile terminal and/or output an alarm signal.

Referring to FIG. 2b and FIG. 2c, the mobile terminal detects that the microphone is shielded during the second time period, and may adjust the configuration of the hands-free call channel of the mobile terminal and/or output the alarm signal.

Specifically, the adjusting the configuration of the hands-free call channel of the mobile terminal may include any one or more of the following adjustment manners:

Adjustment manner 1: improving a gain of the microphone.

For example, the mobile terminal may modify a transmit path gain (TX_GAIN) and a codec transmit path gain (CODEC_TX_GAIN), to improve the gain of the microphone.

Adjustment manner 2: adjusting a filter parameter, an automatic gain control parameter, and/or an echo cancellation parameter that are of the hands-free call channel of the mobile terminal, to reduce a noise floor, a degree of distortion, and/or an echo of a sound picked up by the microphone.

For example, the filter parameter of the hands-free call channel may include a transmit path filter (TX_FILTER), which is mainly used to adjust a frequency response curve of a sound. The automatic gain control (Automatic Gain Control, AGC for short) parameter (AGC_PARAM) is mainly used to adjust a processing threshold and a gain slope that are of a weak signal and a strong signal, a gain of an intermediate signal, and the like. The automatic gain control parameter may include, for example, a transmission direction static gain in automatic gain control (tx_agc_static_gain), a transmission direction gain mode selection flag in automatic gain control (tx_agc_aig), a transmission direction expansion threshold in automatic gain control (tx_agc_exp_thres), a transmission direction expansion slope in automatic gain control (tx_agc_exp_slope), a transmission direction compression threshold in automatic gain control (tx_agc_compr_thres), and a transmission direction compression slope in automatic gain control (tx_agc_compr_slope). The echo cancellation (Echo Cancellation, EC for short) parameter (EC_PARAM) is mainly used to adjust an echo suppression delay and the gain that are of the microphone, and the like. The echo cancellation parameter may include, for example, a nonlinear preprocessing limit (NLPP_limit), a nonlinear preprocessing gain (NLPP_gain), an adaptive filter input signal limit (NLMS_limit), an echo cancellation path delay (echo_path_delay), an adaptive filter step updating coefficient (NLMS_twoalpha), adaptive filter step control (NLMS_erl), energy attenuation of dynamic echo and noise suppression (DENS_tail_alpha), an adaptive filter power estimation portion of dynamic echo and noise suppression (DENS_tail_portion), a maximum amount of dynamic echo and noise suppression (DENS_limit_NS), and a suppression amount of dynamic echo and noise suppression (DENS_NL_atten). The mobile terminal may cooperatively adjust the foregoing parameters, so as to reduce the noise floor, the degree of distortion, and/or the echo of the sound picked up by the microphone, and to balance volume of the sound picked up by the microphone and the noise floor, the degree of distortion, and/or the echo of the sound.

Adjustment manner 3: enabling another microphone of the mobile terminal and using the another microphone as a microphone for a hands-free call.

For example, when the mobile terminal has multiple microphones, if the mobile terminal determines that the microphone of the mobile terminal is shielded, the currently used microphone may be switched to another microphone that is unused. For example, if one microphone is configured on both a top surface and a bottom surface of the mobile terminal, the currently used microphone is the microphone on the bottom surface, and the bottom surface of the mobile terminal is located on a flat surface, the microphone located on the bottom surface of the mobile terminal is shielded. When determining that the currently used microphone is shielded, the mobile terminal may use the microphone located on the top surface of the mobile terminal as a microphone for the current hands-free call.

According to the sound effect control method in this embodiment, a variation in sound pressure of a microphone is detected; when it is detected that the variation in the sound pressure is greater than or equal to a first threshold, it can be determined that the microphone is shielded, and a configuration of a hands-free call channel of a mobile terminal is adjusted and/or an alarm signal is output, which can effectively improve quality of a hands-free call of the mobile terminal.

Embodiment 3

Figure 3:
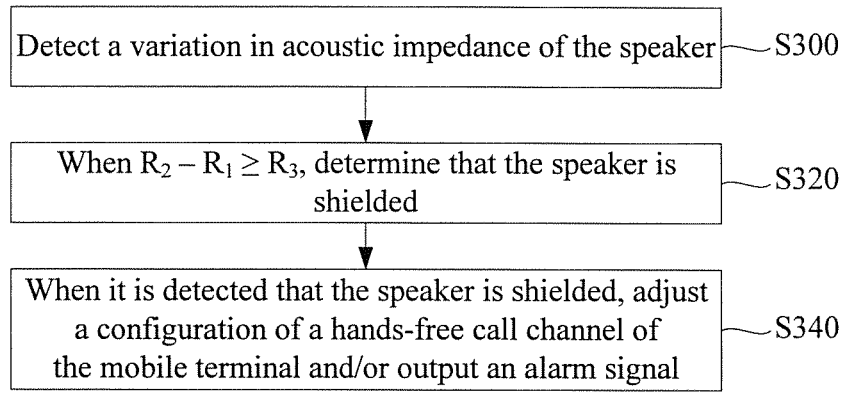
FIG. 3 is a flowchart of a sound effect control method according to Embodiment 3 of the present invention.

FIG. 3 is a flowchart of a sound effect control method according to Embodiment 3 of the present invention.

Step S100 in the foregoing Embodiment 1 may include: detecting whether a speaker of a mobile terminal is shielded. As shown in FIG. 3, the method shown in FIG. 3 is mainly a method of detecting whether the speaker of the mobile terminal is shielded, where the method may include:

Step S300: Detect a variation in acoustic impedance of the speaker.

Step S320: When it is detected that $R_2-R_1 \geq R_3$, determine that the speaker is shielded, where $R_1$ represents acoustic impedance of the speaker at a first time, $R_2$ represents acoustic impedance of the speaker at a current time, and the first time is prior to the current time; $R_3$ represents a second threshold.

Specifically, according to a characteristic of the speaker, the acoustic impedance of the speaker may accordingly change when a sound hole of the speaker is shielded, for example, being shielded by a finger. Therefore, detecting whether the speaker is shielded may be performed by detecting the variation in the acoustic impedance of the speaker. The acoustic impedance of the speaker may be detected by using many methods. For example, the mobile terminal may first detect a current of the speaker, and then the acoustic impedance of the speaker is obtained through calculation according to a conversion relationship between the detected current of the speaker and the acoustic impedance of the speaker. If $R_2-R_1 \geq R_3$, it can be determined that the speaker is shielded.

For example, it is assumed that the second threshold is 1 ohm, one resistance with low precision (for example, the precision is 1%) and a small resistance (for example, the resistance is 0.1 ohm) is connected in series to one tributary of the speaker, and two analog to digital converters (Analog to Digital Converter, ADC for short) are added to the tributary, to detect a current of the tributary of the speaker. Because a voltage of the tributary does not change, the current of the tributary accordingly decreases if acoustic impedance of the tributary increases; the current of the tributary accordingly increases if the acoustic impedance of the tributary decreases. Therefore, a codec digital signal processor (Codec digital signal processing, Codec DSP for short) may determine, according to a variation in the current of the tributary, whether the speaker is shielded. After the ADCs detect the current of the tributary of the speaker, the Codec DSP may obtain the acoustic impedance of the tributary of the speaker through calculation according to a conversion relationship between the acoustic impedance and the current, and then calculate a difference between the acoustic impedance of the tributary of the speaker and acoustic impedance that is at a time when the speaker is not shielded. If acoustic impedance of the tributary of the speaker at the current time is 1.5 ohm greater than acoustic impedance at a previous time (the first time), it can be determined that the speaker is shielded because 1.5 ohm is greater than 1 ohm. If acoustic impedance of the tributary of the speaker at the current time is 0.5 ohm greater than acoustic impedance at a previous time (the first time), it can be determined that the speaker is not shielded because 0.5 ohm is less than 1 ohm.

Step S340: When it is detected that the speaker is shielded, adjust a configuration of a hands-free call channel of the mobile terminal and/or output an alarm signal.

Specifically, the adjusting the configuration of the hands-free call channel of the mobile terminal may include any one or more of the following adjustment manners:

Adjustment manner 1: raising volume of the speaker.

For example, the mobile terminal may modify a receive path gain (RX_GAIN) and a codec receive path gain (CODEC_RX_GAIN), to raise the volume of the speaker.

Adjustment manner 2: adjusting a filter parameter, an automatic gain control parameter, and/or an echo cancellation parameter that are of the hands-free call channel of the mobile terminal, to reduce a noise floor, a degree of distortion, and/or an echo of a sound output by the speaker.

For example, the filter parameter of the hands-free call channel may include a receive path filter RX_FILTER, which is mainly used to adjust a frequency response curve of a sound. The automatic gain control parameter (AGC_PARAM) is mainly used to adjust a processing threshold and a gain slope that are of a weak signal and a strong signal, a gain of an intermediate signal, and the like. The automatic gain control parameter may include, for example, a receiving direction static gain in automatic gain control (rx_agc_static_gain), a receiving direction gain mode selection flag in automatic gain control (rx_agc_aig), a receiving direction expansion threshold in automatic gain control (rx_agc_exp_thres), a receiving direction expansion slope in automatic gain control (rx_agc_exp_slope), a receiving direction compression threshold in automatic gain control (rx_agc_compr_thres), and a receiving direction compression slope in automatic gain control (rx_agc_compr_slope). The echo cancellation parameter (EC_PARAM) is mainly used to adjust an echo suppression delay and the gain that are of the speaker, and the like. The echo cancellation parameter may include, for example, a nonlinear preprocessing limit (NLPP_limit), a nonlinear preprocessing gain (NLPP_gain), an adaptive filter input signal limit (NLMS_limit), an echo cancellation path delay (echo_path_delay), an adaptive filter step updating coefficient (NLMS_twoalpha), adaptive filter step control (NLMS_erl), energy attenuation of dynamic echo and noise suppression (DENS_tail_alpha), an adaptive filter power estimation portion of dynamic echo and noise suppression (DENS_tail_portion), a maximum amount of dynamic echo and noise suppression (DENS_limit_NS), and a suppression amount of dynamic echo and noise suppression (DENS_NL_atten). The mobile terminal may cooperatively adjust the foregoing parameters, so as to reduce the noise floor, the degree of distortion, and/or the echo of the sound output by the speaker, and to balance volume of the sound output by the speaker and the noise floor, the degree of distortion, and/or the echo of the sound.

Adjustment manner 3: enabling another speaker of the mobile terminal and using the another speaker as a speaker for a hands-free call.

For example, when the mobile terminal has multiple speakers, if the mobile terminal determines that the speaker of the mobile terminal is shielded, the currently used speaker may be switched to another speaker that is unused.

According to the sound effect control method in this embodiment, a variation in acoustic impedance of a speaker is detected; when it is detected that a difference between acoustic impedance of the speaker at a current time and acoustic impedance of the speaker at a first time is greater than or equal to a second threshold, it can be determined that the speaker is shielded, and a configuration of a hands-free call channel of a mobile terminal is adjusted and/or an alarm signal is output, which can effectively improve quality of a hands-free call of the mobile terminal.

Embodiment 4

Figure 4:
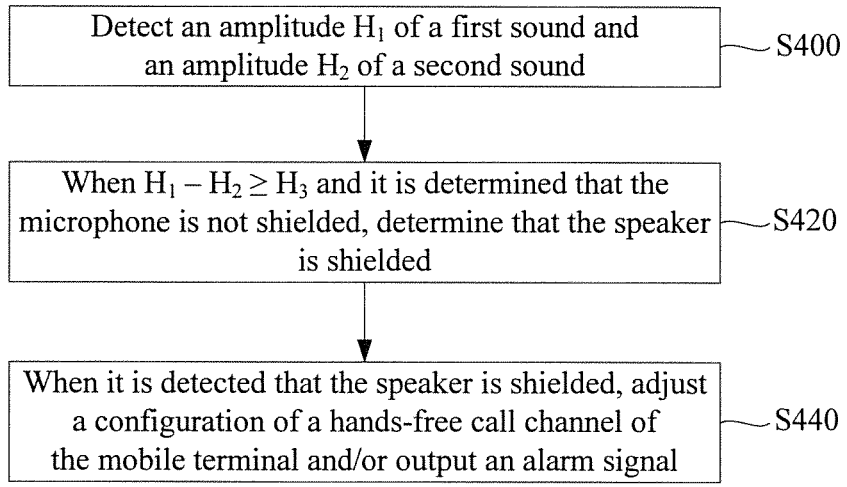
FIG. 4 is a flowchart of a sound effect control method according to Embodiment 4 of the present invention.

FIG. 4 is a flowchart of a sound effect control method according to Embodiment 4 of the present invention.

Step S100 in the foregoing Embodiment 1 may include: detecting whether a speaker of a mobile terminal is shielded. As shown in FIG. 4, the method shown in FIG. 4 is mainly a method of detecting whether the speaker of the mobile terminal is shielded, where the method may include:

Step S400: Detect an amplitude $H_1$ of a first sound and an amplitude $H_2$ of a second sound, where the first sound is a sound that is picked up inside the mobile terminal and to be output by the speaker, and the second sound is a sound that is picked up by the microphone and that is obtained after the first sound is output by the speaker.

Step S420: When $H_1 - H_2 \geq H_3$ and it is determined that the microphone is not shielded, determine that the speaker is shielded, where $H_3$ represents a third threshold.

Specifically, the sound to be picked up inside the mobile terminal may be implemented by using a codec (codec) of the mobile terminal. If the speaker is shielded, for example, being shielded by a finger, the amplitude $H_2$ of the second sound obviously decreases. However, the second sound not only relates to the speaker, but also relates to the microphone, so that whether the speaker is shielded cannot be determined only by detecting that a difference between the amplitude of the first sound and the amplitude of the second sound is greater than or equal to the third threshold. If the difference between the amplitude of the first sound and the amplitude of the second sound is greater than or equal to the third threshold, it is possible that the microphone is shielded, or that the speaker is shielded. That is, if the difference between the amplitude of the first sound and the amplitude of the second sound is greater than or equal to the third threshold (for example, the third threshold is 12 dB), the sound effect control method in the foregoing Embodiment 2 needs to be used to determine that the microphone is not shielded, and then it can be determined that the speaker is shielded.

Step S440: When it is detected that the speaker is shielded, adjust a configuration of a hands-free call channel of the mobile terminal and/or output an alarm signal.

For the adjusting the configuration of the hands-free call channel of the mobile terminal, reference may be specifically made to a related description of step S340 in the foregoing Embodiment 3.

In addition, it should be noted that, although both this embodiment and the foregoing Embodiment 3 provide a method of determining that the speaker is shielded, a person skilled in the art can understand that the present invention should not be limited thereto. Actually, to improve accuracy of determining whether the speaker is shielded, the sound effect control method in this embodiment and the sound effect control method in the foregoing Embodiment 3 can be used in combination.

According to the sound effect control method in this embodiment, an amplitude of a first sound and an amplitude of a second sound are detected; when a difference between the amplitude of the first sound and the amplitude of the second sound is greater than or equal to a third threshold and a microphone is not shielded, it can be determined that a speaker is shielded, and a configuration of a hands-free call channel of a mobile terminal is adjusted and/or an alarm signal is output, which can effectively improve quality of a hands-free call of the mobile terminal.

Embodiment 5

Figure 5:
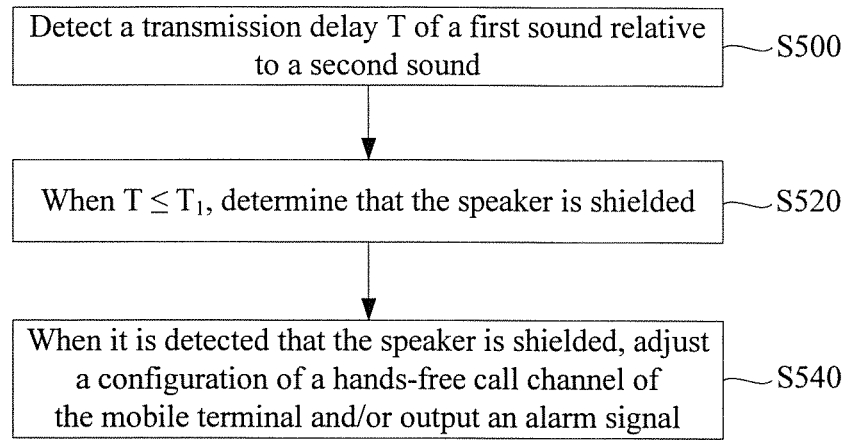
FIG. 5 is a flowchart of a sound effect control method according to Embodiment 5 of the present invention.

FIG. 5 is a flowchart of a sound effect control method according to Embodiment 5 of the present invention.

Step S100 in the foregoing Embodiment 1 may include: detecting whether a speaker of a mobile terminal is shielded. As shown in FIG. 5, the method shown in FIG. 5 is mainly a method of detecting whether the speaker of the mobile terminal is shielded, where the method may include:

Step S500: Detect a transmission delay T of a first sound relative to a second sound, where the first sound is a sound that is picked up inside the mobile terminal and to be output by the speaker, and the second sound is a sound that is picked up by the microphone and that is obtained after the first sound is output by the speaker.

Step S520: When $T \leq T_1$, determine that the speaker is shielded, where $T_1$ represents a fourth threshold.

Specifically, because transmission speeds of a sound are different indifferent transmission media, if the speaker is shielded, for example, being shielded by a finger or a tabletop, it is detected that the transmission delay T of the first sound relative to the second sound is less than or equal to a transmission delay that is during a normal call. Therefore, when it is detected that $T \leq T_1$, it can be determined that the speaker is shielded.

Step S540: When it is detected that the speaker is shielded, adjust a configuration of a hands-free call channel of the mobile terminal and/or output an alarm signal.

For the adjusting the configuration of the hands-free call channel of the mobile terminal, reference may be specifically made to a related description of step S340 in the foregoing Embodiment 3.

In addition, it should be noted that, although all of this embodiment, the foregoing Embodiment 3, and the foregoing Embodiment 4 provide a method of determining that the speaker is shielded, a person skilled in the art can understand that the present invention should not be limited thereto. Actually, to improve accuracy of determining whether the speaker is shielded, the sound effect control method in this embodiment and the sound effect control methods in the foregoing Embodiment 3 and the foregoing Embodiment 4 may be used in combination.

According to the sound effect control method in this embodiment, a transmission delay of a first sound relative to a second sound is detected; when the transmission delay is less than or equal to a fourth threshold, it can be determined that a speaker is shielded, and a configuration of a hands-free call channel of a mobile terminal is adjusted and/or an alarm signal is output, which can effectively improve quality of a hands-free call of the mobile terminal.

It can be learned from descriptions of the foregoing Embodiment 1 to Embodiment 5 that, whether a microphone is shielded may be determined by detecting a variation in sound pressure of the microphone; whether a speaker is shielded may be determined by detecting a variation in acoustic impedance of the speaker; whether the speaker is shielded may be determined with reference to determining about whether the microphone is shielded and according to a variation between amplitudes of a sound that is picked up inside a terminal device and to be output by the speaker and a sound that is picked up by the microphone and that is obtained after the sound picked up inside the terminal device is output by the speaker; and whether the speaker is shielded may be determined according to a transmission delay of the sound that is picked up inside the terminal device and to be output by the speaker, relative to the sound that is picked up by the microphone and that is obtained after the sound picked up inside the terminal device is output by the speaker. Although only a combination of two methods and a combination of three methods of the foregoing detection methods are described, a person skilled in the art can understand that the present invention should not be limited thereto. Actually, any one or more of the foregoing detection methods may be randomly used according to a quality requirement of a voice call, to consider, as much as possible, both optimization of a sound effect of a hands-free call of a mobile terminal and optimization of required processing load.

In addition, after the mobile terminal adjusts a configuration of a hands-free call channel of the mobile terminal and/or outputs an alarm signal, if it is detected, by using all methods available for the mobile terminal, that the hands-free call channel of the mobile terminal is not shielded, the mobile terminal may recover the configuration of the hands-free call channel of the mobile terminal.

Embodiment 6

Figure 6:
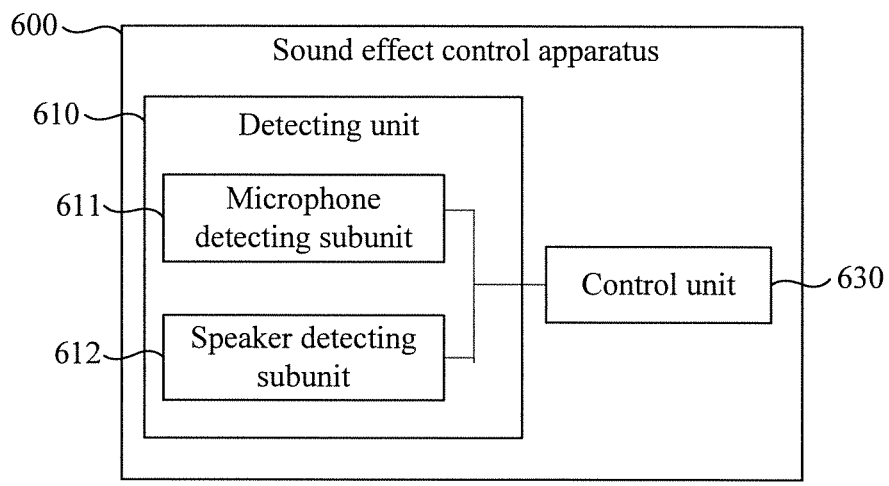
FIG. 6 is a structural block diagram of a sound effect control apparatus according to Embodiment 6 of the present invention.

FIG. 6 is a structural block diagram of a sound effect control apparatus according to Embodiment 6 of the present invention. A sound effect control apparatus 600 provided in this embodiment is configured to implement the sound effect control method provided in the embodiment shown in FIG. 1. As shown in FIG. 6, the sound effect control apparatus 600 may include a detecting unit 610 and a control unit 630.

The detecting unit 610 is configured to: when a hands-free call is performed for a mobile terminal, detect whether a hands-free call channel of the mobile terminal is shielded.

Specifically, the mobile terminal may include the sound effect control apparatus. When a user uses a mobile terminal such as a mobile phone, a tablet, or a notebook computer to perform a hands-free call such as a hands-free voice call or a hands-free video call, a detecting unit 610 of the mobile terminal may detect whether a hands-free call channel of the mobile terminal is shielded. For example, when the user uses a mobile phone to perform a hands-free call, a detecting unit 610 of the mobile phone may detect whether a microphone of the mobile phone and/or a speaker of the mobile phone is shielded; for example, the microphone of the mobile phone is shielded by the user or a flat surface, or the speaker of the mobile phone is shielded by the user or a flat surface.

In an embodiment of the present invention, the detecting unit 610 includes:

a microphone detecting subunit 611, configured to detect whether a microphone of the mobile terminal is shielded; and a speaker detecting subunit 612, configured to detect whether a speaker of the mobile terminal is shielded.

The control unit 630 is connected to the detecting unit 610 and is configured to: when the detecting unit 610 detects that the hands-free call channel of the mobile terminal is shielded, adjust a configuration of the hands-free call channel of the mobile terminal and/or output an alarm signal to inform a user that the hands-free call channel is shielded.

Specifically, when the control unit 630 of the mobile terminal not only adjusts the configuration of the hands-free call channel of the mobile terminal but also outputs the alarm signal, the following cases may be included:

Case 1: When the detecting unit 610 detects that the hands-free call channel of the mobile terminal is shielded, the control unit 630 may output the alarm signal after adjusting the configuration of the hands-free call channel of the mobile terminal. After learning the alarm signal, the user may not remove the shield. In this case, the control unit 630 can still optimize a sound effect of the hands-free call even if the user does not remove the shield. The user may learn, according to the alarm signal, that measures have been taken for the mobile terminal to improve the sound effect of the current hands-free call, and user experience is favorable. In addition, the user may also remove the shield; in this case, the adjusted configuration of the call channel may be recovered, and the call recovers.

Case 2: When the detecting unit 610 detects that the hands-free call channel of the mobile terminal is shielded, the control unit 630 may output the alarm signal before adjusting the configuration of the hands-free call channel of the mobile terminal. In this case, if the user removes the shield, the call recovers; if the user does not remove the shield within a time period, the control unit 630 may adjust the configuration of the hands-free call channel of the mobile terminal and/or continue to output the alarm signal.

Case 3: When the detecting unit 610 detects that the hands-free call channel of the mobile terminal is shielded, the control unit 630 may output the alarm signal when adjusting the configuration of the hands-free call channel of the mobile terminal. In this case, if the user removes the shield, the call recovers; if the user does not remove the shield, the control unit 630 may continue to adjust the configuration of the hands-free call channel of the mobile terminal.

It should be noted that, the control unit can still output the alarm signal even when the detecting unit detects that the hands-free call channel of the mobile terminal is shielded; however, when the control unit does not output the alarm signal and only adjusts the configuration of the hands-free call channel, impact on user experience due to excessive alarms can be avoided.

According to the sound effect control apparatus in this embodiment, when a hands-free call is performed for a mobile terminal, a detecting unit detects whether a hands-free call channel of the mobile terminal is shielded; when the hands-free call channel of the mobile terminal is shielded, a control unit adjusts a configuration of the hands-free call channel of the mobile terminal and/or outputs an alarm signal, which can effectively improve quality of the hands-free call of the mobile terminal.

Embodiment 7

Figure 7:
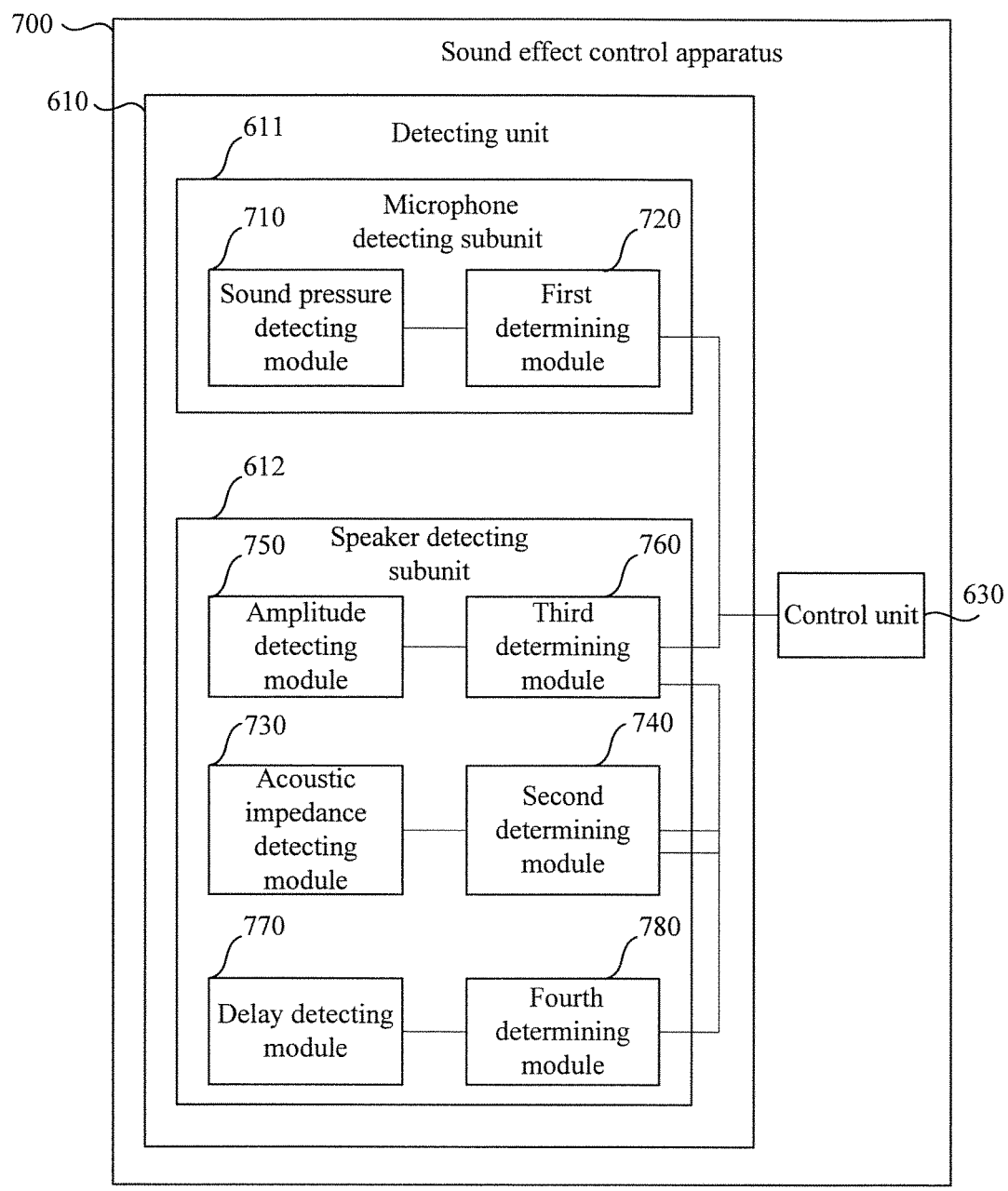
FIG. 7 is a structural block diagram of a sound effect control apparatus according to Embodiment 7 of the present invention.

FIG. 7 is a structural block diagram of a sound effect control apparatus according to Embodiment 7 of the present invention. A sound effect control apparatus 700 provided in this embodiment is configured to implement the sound effect control methods provided in the embodiments shown in FIG. 2b, and FIG. 3 to FIG. 5. Components in FIG. 7 that have same reference numerals as those in FIG. 6 include a detecting unit 610, a microphone detecting subunit 611, a speaker detecting subunit 612, and a control unit 630, and have functions basically the same as those described above. For brevity, no detailed description of these components is provided.

In addition, it can be learned, by comparing FIG. 7 with FIG. 6, that a main difference between the embodiment shown in FIG. 7 and the embodiment shown in FIG. 6 lies in that, based on the embodiment shown in FIG. 6, the microphone detecting subunit 611 specifically includes:

a sound pressure detecting module 710, configured to detect a variation in sound pressure of the microphone; and a first determining module 720, which is connected to the sound pressure detecting module 710 and is configured to: when the sound pressure detecting module detects that $F_1-F_2 \geq F_3$, determine that the microphone is shielded, where $F_1$ represents sound pressure of the microphone during a first time period, $F_2$ represents sound pressure of the microphone during a second time period, and the first time period is prior to the second time period; $F_3$ represents a first threshold.

Specifically, the sound pressure detecting module 710 may detect the variation in the sound pressure of the microphone of the mobile terminal by using many methods. For example, the sound pressure detecting module 710 may first detect a voltage of the microphone, and then the sound pressure of the microphone is obtained through calculation according to a conversion relationship between the voltage of the microphone and the sound pressure of the microphone.

For example, referring to FIG. 2b, in FIG. 2b and FIG. 2c, the first threshold $F_3$ is 6 dB, and a voice source used for local speaking is 1 kHz 0 dB, that is, a sound pressure level of audible threshold sound pressure of a human body is 0 dB. In FIG. 2b, sound pressure detected during a time period from 1 ms to 14 ms is detected by the sound pressure detecting module 710 when the microphone is not shielded, and sound pressure detected during a time period from 14 ms to 27 ms is detected by the sound pressure detecting module 710 when the microphone is shielded (for example, when a finger blocks the microphone). As shown in FIG. 2b, the first time period is 13 ms, a start time of the first time period is 1 ms, and an end time of the first time period is 14 ms; the second time period is 13 ms, a start time of the second time period is 14 ms, and an end time of the second time period is 27 ms. It can be learned from FIG. 2b that, the sound pressure detecting module 710 may first detect that the sound pressure $F_1$ of the microphone of the mobile terminal during the first time period is −3 dB, and the sound pressure $F_2$ during the second time period is −21 dB. The sound pressure detecting module 710 may detect that $F_1-F_2$ is 18 dB and the value is greater than the first threshold 6 dB, that is, $F_1-F_2 \geq F_3$. Therefore, the first determining module 720 can determine that the microphone is shielded during the second time period, which conforms with an actual situation. Likewise, in FIG. 2c, the sound pressure detecting module 710 may also learn that a difference between the sound pressure $F_1$ during the first time period and the sound pressure $F_2$ during the second time period is approximately 18 dB and the value is greater than the first threshold 6 dB, and the first determining module 720 may also learn a determining result that conforms with an actual situation.

When the first determining module 720 determines that the microphone of the mobile terminal is shielded, the control unit 630 may adjust a configuration of a hands-free call channel of the mobile terminal and/or output an alarm signal to inform a user that the hands-free call channel is shielded.

Referring to FIG. 2b and FIG. 2c, the first determining module 720 determines that the microphone is shielded during the second time period, and the control unit 630 may adjust the configuration of the hands-free call channel of the mobile terminal and/or output the alarm signal.

Specifically, that the control unit 630 adjusts the configuration of the hands-free call channel of the mobile terminal may include any one or more of the following adjustment manners:

Adjustment manner 1: The control unit 630 may improve a gain of the microphone.

For example, the control unit 630 may modify a transmit path gain (TX_GAIN) and a codec transmit path gain (CODEC_TX_GAIN), to improve the gain of the microphone.

Adjustment manner 2: The control unit 630 may adjust a filter parameter, an automatic gain control parameter, and/or an echo cancellation parameter that are of the hands-free call channel of the mobile terminal, to reduce a noise floor, a degree of distortion, and/or an echo of a sound picked up by the microphone.

For example, the filter parameter of the hands-free call channel may include a transmit path filter (TX_FILTER), and the control unit 630 may adjust a frequency response curve of a sound by adjusting the transmit path filter. The control unit 630 may adjust a processing threshold and a gain slope that are of a weak signal and a strong signal, a gain of an intermediate signal, and the like, by adjusting the automatic gain control parameter (AGC_PARAM). The automatic gain control parameter may include, for example, a transmission direction static gain in automatic gain control (tx_agc_static_gain), a transmission direction gain mode selection flag in automatic gain control (tx_agc_aig), a transmission direction expansion threshold in automatic gain control (tx_agc_exp_thres), a transmission direction expansion slope in automatic gain control (tx_agc_exp_slope), a transmission direction compression threshold in automatic gain control (tx_agc_compr_thres), and a transmission direction compression slope in automatic gain control (tx_agc_compr_slope). The control unit 630 may adjust an echo suppression delay and the gain that are of the microphone, and the like, by adjusting the echo cancellation parameter (EC_PARAM). The echo cancellation parameter may include, for example, a nonlinear preprocessing limit (NLPP_limit), a nonlinear preprocessing gain (NLPP_gain), an adaptive filter input signal limit (NLMS_limit), an echo cancellation path delay (echo_path_delay), an adaptive filter step updating coefficient (NLMS_twoalpha), adaptive filter step control (NLMS_erl), energy attenuation of dynamic echo and noise suppression (DENS_tail_alpha), an adaptive filter power estimation portion of dynamic echo and noise suppression (DENS_tail_portion), a maximum amount of dynamic echo and noise suppression (DENS_limit_NS), and a suppression amount of dynamic echo and noise suppression (DENS_NL_atten). The control unit 630 may cooperatively adjust the foregoing parameters, so as to reduce the noise floor, the degree of distortion, and/or the echo of the sound picked up by the microphone, and to balance volume of the sound picked up by the microphone and the noise floor, the degree of distortion, and/or the echo of the sound.

Adjustment manner 3: The control unit 630 may enable another microphone of the mobile terminal and use the another microphone as a microphone for a hands-free call.

For example, if the first determining module 720 determines that the microphone of the mobile terminal is shielded, the control unit 630 may switch the currently used microphone to another microphone that is unused. For example, if one microphone is configured on both a top surface and a bottom surface of the mobile terminal, the currently used microphone is the microphone on the bottom surface, and the bottom surface of the mobile terminal is located on a flat surface, the microphone located on the bottom surface of the mobile terminal is shielded. When the first determining module 720 determines that the currently used microphone is shielded, the control unit 630 may use the microphone located on the top surface of the mobile terminal as a microphone for the current hands-free call.

Further, it can be learned, by comparing FIG. 7 with FIG. 6, that a difference between the embodiment shown in FIG. 7 and the embodiment shown in FIG. 6 further lies in that, based on the embodiment shown in FIG. 6, the speaker detecting subunit 612 specifically includes:

an acoustic impedance detecting module 730 and a second determining module 740; and/or an amplitude detecting module 750 and a third determining module 760; and/or a delay detecting module 770 and a fourth determining module 780.

The acoustic impedance detecting module 730 is configured to detect a variation in acoustic impedance of the speaker.

The second determining module 740 is connected to the acoustic impedance detecting module 730 and is configured to: when $R_2-R_1 \geq R_3$, determine that the speaker is shielded, where $R_1$ represents acoustic impedance of the speaker at a first time, $R_2$ represents acoustic impedance of the speaker at a current time, and the first time is prior to the current time; $R_3$ represents a second threshold.

Specifically, according to a characteristic of the speaker, the acoustic impedance of the speaker may accordingly change when a sound hole of the speaker is shielded, for example, being shielded by a finger. Therefore, whether the speaker is shielded may be detected by using the acoustic impedance detecting module 730 to detect the variation in the acoustic impedance of the speaker. The acoustic impedance detecting module 730 may detect the acoustic impedance of the speaker by using many methods. For example, the acoustic impedance detecting module 730 may first detect a current of the speaker, and then the acoustic impedance of the speaker is obtained through calculation according to a conversion relationship between the detected current of the speaker and the acoustic impedance of the speaker. If $R_2-R_1 \geq R_3$, the second determining module 740 can determine that the speaker is shielded. For a specific example, reference may be made to a related description of step S320 in the foregoing Embodiment 3.

The amplitude detecting module 750 is configured to detect an amplitude $H_1$ of a first sound and an amplitude $H_2$ of a second sound, where the first sound is a sound that is picked up inside the mobile terminal and to be output by the speaker, and the second sound is a sound that is picked up by the microphone and that is obtained after the first sound is output by the speaker.

The third determining module 760 is connected to the amplitude detecting module 750 and the microphone detecting subunit 611, and is configured to: when the amplitude detecting module 750 detects that $H_1-H_2 \geq H_3$ and the microphone detecting subunit 611 determines that the microphone is not shielded, determine that the speaker is shielded, where $H_3$ represents a third threshold.

Specifically, the sound to be picked up inside the mobile terminal may be implemented by using a codec of the mobile terminal. If the speaker is shielded, for example, being shielded by a finger, the amplitude $H_2$ that is of the second sound and detected by the amplitude detecting module 750 obviously decreases. However, the second sound not only relates to the speaker, but also relates to the microphone, so that the third determining module 760 cannot determine whether the speaker is shielded, only by using the amplitude detecting module 750 to detect that a difference between the amplitude of the first sound and the amplitude of the second sound is greater than or equal to the third threshold. If the difference between the amplitude of the first sound and the amplitude of the second sound is greater than or equal to the third threshold, it is possible that the microphone is shielded, or that the speaker is shielded. That is, if the amplitude detecting module 750 detects that the difference between the amplitude of the first sound and the amplitude of the second sound is greater than or equal to the third threshold (for example, the third threshold is 12 dB), the microphone detecting subunit 611 needs to be used to determine that the microphone is not shielded, and then the third determining module 760 can determine that the speaker is shielded.

The delay detecting module 770 is configured to detect a transmission delay T of the first sound relative to the second sound, where the first sound is the sound that is picked up inside the mobile terminal and to be output by the speaker, and the second sound is a sound that is picked up by the microphone and that is obtained after the first sound is output by the speaker.

The fourth determining module 780 is connected to the delay detecting module 770 and is configured to: when $T \leq T_1$, determine that the speaker is shielded, where $T_1$ represents a fourth threshold.

Specifically, because transmission speeds of a sound are different in different transmission media, if the speaker is shielded, for example, being shielded by a finger or a tabletop, the delay detecting module 770 may detect that the transmission delay T of the first sound relative to the second sound is less than or equal to a transmission delay that is during a normal call. Therefore, when the delay detecting module 770 detects that $T \leq T_1$, the fourth determining module 780 can determine that the speaker is shielded.

When at least one module of the second determining module 740, the third determining module 760, and the fourth determining module 780 determines that the speaker of the mobile terminal is shielded, the control unit 630 may adjust the configuration of the hands-free call channel of the mobile terminal and/or output the alarm signal to inform the user that the hands-free call channel is shielded.

Specifically, that the control unit 630 adjusts the configuration of the hands-free call channel of the mobile terminal may include any one or more of the following adjustment manners:

Adjustment manner 1: The control unit 630 may raise volume of the speaker.

For example, the control unit 630 may modify a receive path gain (RX_GAIN) and a codec receive path gain (CODEC_RX_GAIN), to raise the volume of the speaker.

Adjustment manner 2: The control unit 630 may adjust a filter parameter, an automatic gain control parameter, and/or an echo cancellation parameter that are of the hands-free call channel of the mobile terminal, to reduce a noise floor, a degree of distortion, and/or an echo of a sound output by the speaker.

For example, the filter parameter of the hands-free call channel may include a receive path filter RX_FILTER, and the control unit 630 may adjust a frequency response curve of a sound by adjusting the receive path filter. The control unit 630 may adjust a processing threshold and a gain slope that are of a weak signal and a strong signal, a gain of an intermediate signal, and the like, by adjusting the automatic gain control parameter (AGC_PARAM). The automatic gain control parameter may include, for example, a receiving direction static gain in automatic gain control (rx_agc_static_gain), a receiving direction gain mode selection flag in automatic gain control (rx_agc_aig), a receiving direction expansion threshold in automatic gain control (rx_agc_exp_thres), a receiving direction expansion slope in automatic gain control (rx_agc_exp_slope), a receiving direction compression threshold in automatic gain control (rx_agc_compr_thres), and a receiving direction compression slope in automatic gain control (rx_agc_compr_slope). The control unit 630 may adjust an echo suppression delay and the gain that are of the speaker, and the like, by adjusting the echo cancellation parameter (EC_PARAM). The echo cancellation parameter may include, for example, a nonlinear preprocessing limit (NLPP_limit), a nonlinear preprocessing gain (NLPP_gain), an adaptive filter input signal limit (NLMS_limit), an echo cancellation path delay (echo_path_delay), an adaptive filter step updating coefficient (NLMS_twoalpha), adaptive filter step control (NLMS_erl), energy attenuation of dynamic echo and noise suppression (DENS_tail_alpha), an adaptive filter power estimation portion of dynamic echo and noise suppression (DENS_tail_portion), a maximum amount of dynamic echo and noise suppression (DENS_limit_NS), and a suppression amount of dynamic echo and noise suppression (DENS_NL_atten). The control unit 630 may cooperatively adjust the foregoing parameters, so as to reduce the noise floor, the degree of distortion, and/or the echo of the sound output by the speaker, and to balance volume of the sound output by the speaker and the noise floor, the degree of distortion, and/or the echo of the sound.

Adjustment manner 3: The control unit 630 may enable another speaker of the mobile terminal and use the another speaker as a speaker for the hands-free call.

For example, when the mobile terminal has multiple speakers, if at least one module of the second determining module 740, the third determining module 760, and the fourth determining module 780 determines that the speaker of the mobile terminal is shielded, the control unit 630 may switch the currently used speaker to another speaker that is unused.

According to the sound effect control apparatus in this embodiment, a microphone detecting subunit detects whether a microphone is shielded; a speaker detecting subunit detects whether a speaker is shielded; when the microphone detecting subunit detects that the microphone is shielded and/or the speaker detecting subunit detects that the speaker is shielded, a control unit may adjust a configuration of a hands-free call channel of a mobile terminal and/or output an alarm signal, which can effectively improve quality of a hands-free call of the mobile terminal.

It can be learned from descriptions of the foregoing Embodiment 6 and Embodiment 7 that, whether a microphone is shielded may be determined by using a sound pressure detecting module to detect a variation in sound pressure of the microphone; whether a speaker is shielded may be determined by using an acoustic impedance detecting module to detect a variation in acoustic impedance of the speaker; whether the speaker is shielded may be determined with reference to determining about whether the microphone is shielded and by using an amplitude detecting module to detect a variation between amplitudes of a sound that is picked up inside a terminal device and to be output by the speaker and a sound that is picked up by the microphone and that is obtained after the sound picked up inside the terminal device is output by the speaker; and whether the speaker is shielded may be determined by using a delay detecting module to detect a transmission delay of the sound that is picked up inside the terminal device and to be output by the speaker, relative to the sound that is picked up by the microphone and that is obtained after the sound picked up inside the terminal device is output by the speaker. Any one or more of the foregoing detecting modules may be randomly used for a detecting unit according to a quality requirement of a voice call, to consider, as much as possible, both optimization of a sound effect of a hands-free call of a mobile terminal and optimization of required processing load.

In addition, after a control unit adjusts a configuration of a hands-free call channel of the mobile terminal and/or outputs an alarm signal, if it is detected, by using all detecting units of the mobile terminal, that the hands-free call channel of the mobile terminal is not shielded, the control unit may recover the configuration of the hands-free call channel of the mobile terminal.

Embodiment 8

Figure 8:
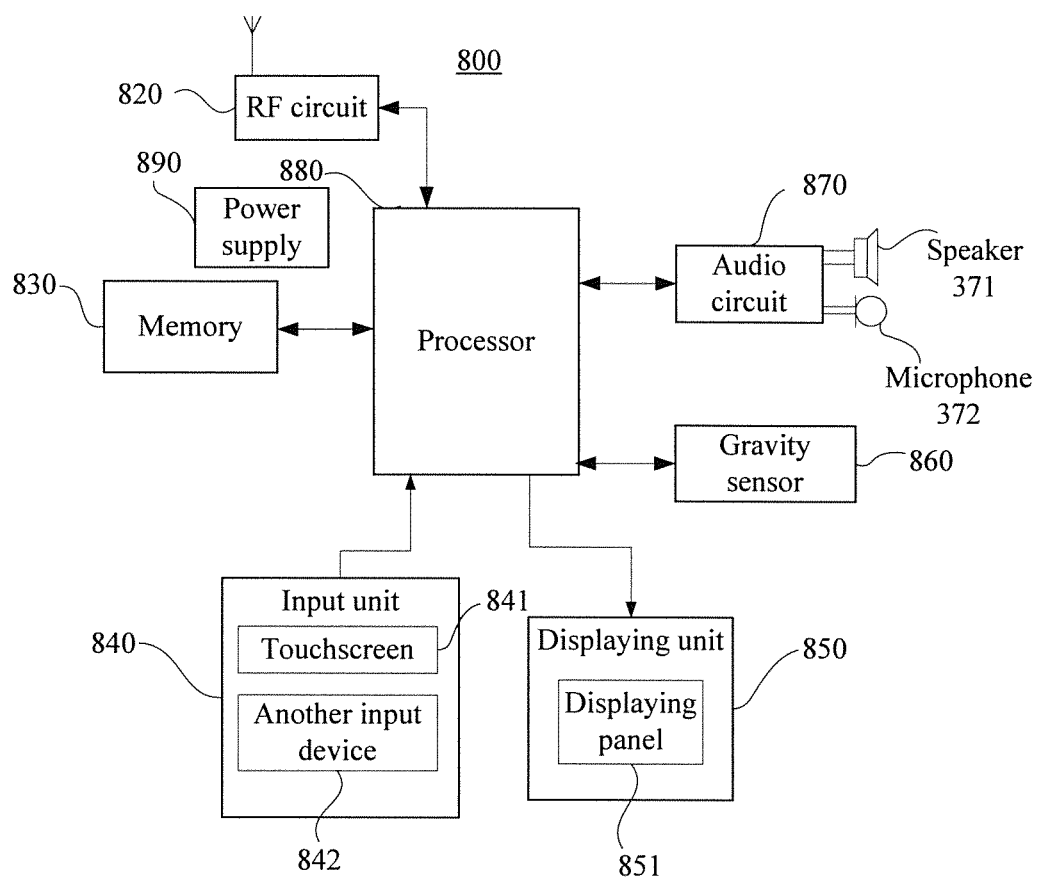
FIG. 8 is a structural block diagram of a sound effect control apparatus according to Embodiment 8 of the present invention.

FIG. 8 is a structural block diagram of a sound effect control apparatus according to Embodiment 8 of the present invention. The sound effect control apparatus provided in this embodiment of the present invention may be configured to implement the methods implemented in the embodiments of the present invention that are shown in FIG. 1, FIG. 2*a*, and FIG. 3 to FIG. 5. For ease of description, only a part related to this embodiment of the present invention is shown. For specific technical details that are not disclosed, reference is made to the embodiments of the present invention that are shown in FIG. 1, FIG. 2*a*, and FIG. 3 to FIG. 5.

The sound effect control apparatus may be a terminal device, such as a mobile phone, a tablet, a notebook computer, a UMPC (Ultra-mobile Personal Computer, ultra-mobile personal computer), a netbook, a PDA (Personal Digital Assistant, personal digital assistant). In this embodiment of the present invention, an example in which a mobile terminal is a mobile phone is used for description. FIG. 8 shows a block diagram of a partial structure of a mobile phone 800 related to the embodiments of the present invention.

As shown in FIG. 8, the mobile phone 800 includes parts such as an RF (radio frequency, radio frequency) circuit 820, a memory 830, an input unit 840, a displaying unit 850, a gravity sensor 860, an audio circuit 870, a processor 880, and a power supply 890. A person skilled in the art may understand that a structure of the mobile phone shown in FIG. 8 constitutes no limitation on the mobile phone; the mobile phone may include more or fewer components than those shown in FIG. 8, or a combination of some components, or components disposed differently.

The following specifically introduces, with reference to FIG. 8, each integral part of the mobile phone 800:

The RF circuit 820 may be configured to: receive and send a signal during an information receiving or sending process or a call process; particularly, after receiving downlink information of a base station, send the downlink information to the processor 880 for processing; and send uplink data to the base station. Generally, the RF circuit includes but is not limited to an antenna, at least one amplifier, a transceiver, a coupler, an LNA (low noise amplifier, low noise amplifier), a duplexer, and the like. In addition, the RF circuit 820 may further communicate with a network and another device by means of wireless communications. The wireless communications may use any communications standard or protocol, including but not limited to GSM (global system of mobile communication, Global System for Mobile Communications), GPRS (general packet radio service, General Packet Radio Service), CDMA (code division multiple access, Code Division Multiple Access), WCDMA (wideband code division multiple access, Wideband Code Division Multiple Access), LTE (long term evolution, Long Term Evolution), email, SMS (short messaging service, short message service), and the like.

The memory 830 may be configured to store a software program and a module; and by running the software program and the module that are stored in the memory 830, the processor 880 executes various functional applications of the mobile phone 800 and performs data processing. The memory 830 may mainly include a program storage area and a data storage area, where the program storage area may store an operating system, and an application program required by at least one function (such as an audio play function or a video play function), and the like; and the data storage area may store data (such as audio data, video data, or a phonebook) created according to use of the mobile phone 800, and the like. In addition, the memory 830 may include a high-speed random access memory, and may further include a non-volatile memory, for example, at least one magnetic disk memory, a flash memory, or another volatile solid-state memory.

The input unit 840 may be configured to receive input numeral or character information, and generate key signal input related to user setting and functional control of the mobile phone 800. Specifically, the input unit 840 may include a touchscreen 841 and another input device 842. The touchscreen 841, also called a touch panel, may collect a touch operation (for example, an operation performed by a user on the touchscreen 841 or near the touchscreen 841 by using any proper object or accessory, such as a finger or a stylus) that is performed by a user on or near the touchscreen 841, and drive a corresponding connection apparatus according to a preset program. Optionally, the touchscreen 841 may include two portions: a touch detection apparatus and a touch controller. The touch detection apparatus detects a touch location of the user, detects a signal generated by the touch operation, and transmits the signal to the touch controller. The touch controller receives touch information from the touch detection apparatus, converts the touch information into touch coordinates, sends the touch coordinates to the processor 880, and can receive a command sent by the processor 880 and executes the command. In addition, the touchscreen 841 may be implemented by using multiple types, such as a resistive type, a capacitive type, infrared, and a surface acoustic wave. The input unit 840 may further include the another input device 842 in addition to the touchscreen 841. Specifically, the another input device 842 may include but is not limited to one or more of a physical keyboard, a function key (such as a volume control key or a power switch key), a trackball, a mouse, a joystick, and the like.

The displaying unit 850 may be configured to display information input by the user or information provided for the user, and various menus of the mobile phone 800. The displaying unit 850 may include a displaying panel 851. Optionally, the displaying panel 841 may be configured in a form of an LCD (Liquid Crystal Display, liquid crystal display), an OLED (Organic Light-Emitting Diode, organic light-emitting diode), and the like. Further, the touchscreen 841 may cover the displaying panel 851. After the touchscreen 841 detects a touch operation on or near the touchscreen 841, the touchscreen 841 transmits the touch operation to the processor 880 to determine a type of a touch event, and then the processor 880 provides corresponding visual output on the displaying panel 851 according to the type of the touch event. In FIG. 8, the touchscreen 841 and the displaying panel 851 are used as two independent parts to implement input and input functions of the mobile phone 800. However, in some embodiments, the touchscreen 841 and the displaying panel 851 may be integrated to implement the input and output functions of the mobile phone 800.

The gravity sensor (gravity sensor) 860 may detect a value of an acceleration of the mobile phone in each direction (generally, in three axes), detect a value and a direction of gravity of the mobile phone in a static state, and may be used for an application that identifies a mobile phone gesture (such as switching between a screen orientation, related games, and magnetometer posture calibration), a function related to vibration identification (such as a pedometer and a stroke), and the like.

The mobile phone 800 may further include another sensor, such as a light sensor. Specifically, the light sensor may include an ambient light sensor and a proximity sensor. The ambient light sensor may adjust luminance of the displaying panel 841 according to brightness of ambient light; and the proximity sensor may detect whether an object is close to or touches the mobile phone, and may close the displaying panel 841 and/or backlight when the mobile phone 800 approaches an ear. For the mobile phone 800, a gyroscope, a barometer, a hygrometer, a thermometer, an infrared sensor, and other sensors may be further configured, which are not described herein again.

The audio circuit 870, a speaker 871, and a microphone 872 may provide audio interfaces between the user and the mobile phone 800. The mobile phone 800 may have at least one speaker 871 and at least one microphone 872. The audio circuit 870 may transmit a received electrical signal that is obtained after audio data conversion to the speaker 871, and the speaker 871 converts the electrical signal into a sound signal for output. In another aspect, the microphone 872 converts a collected sound signal into an electrical signal; and the audio circuit 870 receives the electrical signal, converts the electrical signal into audio data, and outputs the audio data into the RF circuit 820, so as to send the audio data to, for example, another mobile phone, or output the audio data into the memory 830 for further processing.

The processor 880 is a control center of the mobile phone 800, and uses various interfaces and lines to connect all parts of the entire mobile phone. By running or executing a software program and/or a module that are stored in the memory 830 and invoking data stored in the memory 830, the processor 880 executes various functions of the mobile phone 800 and processes data to perform overall monitoring on the mobile phone. Optionally, the processor 880 may include one or more processing units. Preferably, an application processor and a modem processor may be integrated into the processor 880, where the application processor mainly handles an operating system, a user interface, an application program, and the like; and the modem processor mainly handles wireless communications. It can be understood that, the modem processor may also not be integrated into the processor 880.

The mobile phone 800 further includes the power supply 890 (for example, a battery) that supplies power to the parts. Preferably, the power supply may be logically connected to the processor 880 by using a power management system, to implement functions such as management of charging, discharging, and power consumption by using the power management system.

The mobile phone 800 may further include a WiFi (wireless fidelity, Wireless Fidelity) module, a Bluetooth module, and the like, although these modules are not shown in FIG. 8, and details are not described herein again.

In this embodiment of the present invention, the memory 330 is further configured to store program code that includes a computer operation instruction. The program may be specifically configured to:

when a hands-free call is performed for a mobile terminal, detect whether a hands-free call channel of the mobile terminal is shielded; and adjust a configuration of the hands-free call channel of the mobile terminal and/or output an alarm signal to inform a user that the hands-free call channel is shielded, when it is detected that the hands-free call channel of the mobile terminal is shielded.

In one possible implementation manner, the detecting whether a hands-free call channel of the mobile terminal is shielded includes:

detecting whether a microphone of the mobile terminal is shielded; and/or detecting whether a speaker of the mobile terminal is shielded.

In one possible implementation manner, the detecting whether a microphone of the mobile terminal is shielded includes:

detecting a variation in sound pressure of the microphone; and when it is detected that $F_1-F_2 \geq F_3$, determining that the microphone is shielded, where $F_1$ represents sound pressure of the microphone during a first time period, $F_2$ represents sound pressure of the microphone during a second time period, and the first time period is prior to the second time period; $F_3$ represents a first threshold.

In one possible implementation manner, the adjusting a configuration of the hands-free call channel of the mobile terminal when it is detected that the hands-free call channel of the mobile terminal is shielded includes: adjusting the configuration of the hands-free call channel of the mobile terminal when it is detected that the microphone is shielded, where the adjusting the configuration of the hands-free call channel of the mobile terminal includes any one or more of the following:

improving a gain of the microphone;

adjusting a filter parameter, an automatic gain control parameter, and/or an echo cancellation parameter that are of the hands-free call channel of the mobile terminal, to reduce a noise floor, a degree of distortion, and/or an echo of a sound picked up by the microphone; and enabling another microphone of the mobile terminal and using the another microphone as a microphone for the hands-free call.

In one possible implementation manner, the detecting whether a speaker of the mobile terminal is shielded includes:

detecting a variation in acoustic impedance of the speaker; and when $R_2-R_1 \geq R_3$, determining that the speaker is shielded, where $R_1$ represents acoustic impedance of the speaker at a first time, $R_2$ represents acoustic impedance of the speaker at a current time, and the first time is prior to the current time; $R_3$ represents a second threshold;

or, detecting an amplitude $H_1$ of a first sound and an amplitude $H_2$ of a second sound; and when $H_1-H_2 \geq H_3$ and it is determined that the microphone is not shielded, determining that the speaker is shielded, where $H_3$ represents a third threshold;

or, detecting a transmission delay T of a first sound relative to a second sound; and when $T \leq T_1$, determining that the speaker is shielded, where $T_1$ represents a fourth threshold; where the first sound is a sound that is picked up inside the mobile terminal and to be output by the speaker, and the second sound is a sound that is picked up by the microphone and that is obtained after the first sound is output by the speaker.

In one possible implementation manner, the adjusting a configuration of the hands-free call channel of the mobile terminal when it is detected that the hands-free call channel of the mobile terminal is shielded includes: adjusting the configuration of the hands-free call channel of the mobile terminal when it is detected that the speaker is shielded, where the adjusting the configuration of the hands-free call channel of the mobile terminal includes any one or more of the following:

raising volume of the speaker;

adjusting a filter parameter, an automatic gain control parameter, and/or an echo cancellation parameter that are of the hands-free call channel of the mobile terminal, to reduce a noise floor, a degree of distortion, and/or an echo of a sound output by the speaker; and enabling another speaker of the mobile terminal and using the another speaker as a speaker for the hands-free call.

In this embodiment of the present invention, when a hands-free call is performed for a mobile terminal, whether a hands-free call channel of the mobile terminal is shielded is detected; when the hands-free call channel of the mobile terminal is shielded, a configuration of the hands-free call channel of the mobile terminal is adjusted and/or an alarm signal is output, which can effectively improve quality of the hands-free call of the mobile terminal.

In conclusion, the foregoing descriptions are merely exemplary embodiments of the present invention, but are not intended to limit the protection scope of the present invention. Any modification, equivalent replacement, and improvement made without departing from the spirit and principle of the present invention shall fall within the protection scope of the present invention.

What is claimed is:

1. A sound effect control method, comprising:
   when a hands-free call is performed for a mobile terminal, detecting whether a microphone of the mobile terminal is shielded and detecting whether a speaker of the mobile terminal is shielded, wherein detecting whether the speaker of the mobile terminal is shielded comprises detecting at least one of: a variation in acoustic impedance of the speaker, a difference in amplitude between first and second sounds, and a transmission delay between first and second sounds; and
   when it is detected that the microphone of the mobile terminal is shielded, adjusting at least one of a filter parameter, an automatic gain control parameter, and an echo cancellation parameter of a hands-free call channel of the mobile terminal, so as to reduce at least one of a noise floor, a degree of distortion, and an echo of a sound picked up by the microphone.

2. The sound effect control method according to claim 1, wherein detecting whether the microphone of the mobile terminal is shielded comprises:
   detecting a variation in sound pressure of the microphone; and
   when it is detected that $F_1-F_2 \geq F_3$, determining that the microphone is shielded, wherein $F_1$ represents sound pressure of the microphone during a first time period, $F_2$ represents sound pressure of the microphone during a second time period, and the first time period is prior to the second time period; and $F_3$ represents a first threshold.

3. The sound effect control method according to claim 1, further comprising:
when it is detected that the microphone is shielded, further performing one or more of the following:
improving a gain of the microphone; and
enabling a second microphone of the mobile terminal and using the second microphone as a microphone for the hands-free call.

4. The sound effect control method according to claim 1, wherein:
detecting a variation in acoustic impedance of the speaker comprises:
when it is detected that $R_2-R_1 \geq R_3$, determining that the speaker is shielded, wherein $R_1$ represents acoustic impedance of the speaker at a first time, $R_2$ represents acoustic impedance of the speaker at a current time, and the first time is prior to the current time; $R_3$ represents a second threshold;
detecting a difference in amplitude between first and second sounds comprises:
detecting an amplitude $H_1$ of the first sound and an amplitude $H_2$ of the second sound; and
when $H_1-H_2 \geq H_3$ and it is determined that the microphone is not shielded, determining that the speaker is shielded, wherein $H_3$ represents a third threshold; and
detecting a transmission delay between first and second sounds comprises:
detecting a transmission delay T of the first sound relative to the second sound; and
when $T \leq T_1$, determining that the speaker is shielded, wherein $T_1$, represents a fourth threshold;
wherein the first sound is a sound that is picked up inside the mobile terminal and to be output by the speaker, and the second sound is a sound that is picked up by the microphone and that is obtained after the first sound is output by the speaker.

5. The sound effect control method according to claim 4, further comprising:
when it is detected that the speaker is shielded, performing any one or more of the following:
raising a volume of the speaker;
adjusting at least one of a filter parameter, an automatic gain control parameter, and an echo cancellation parameter that are of the hands-free call channel of the mobile terminal, so as to reduce at least one of a noise floor, a degree of distortion, and an echo of a sound output by the speaker; and
enabling a second speaker of the mobile terminal and using the second speaker as a speaker for the hands-free call.

6. A sound effect control apparatus, comprising:
a detecting unit, configured to: when a hands-free call is performed for a mobile terminal, detect whether a microphone of the mobile terminal is shielded and detect whether a speaker of the mobile terminal is shielded, wherein to detect whether the speaker of the mobile terminal is shielded, the detecting unit is configured to detect at least one of: a variation in acoustic impedance of the speaker, a difference in amplitude between first and second sounds, and a transmission delay between first and second sounds; and
a control unit connected to the detecting unit and configured to: when the detecting unit detects that the microphone of the mobile terminal is shielded, adjust at least one of a filter parameter, an automatic gain control parameter, and an echo cancellation parameter of a hands-free call channel of the mobile terminal, so as to reduce at least one of a noise floor, a degree of distortion, and an echo of a sound picked up by the microphone.

7. The sound effect control apparatus according to claim 6, further comprising:
a sound pressure detecting module, configured to detect a variation in sound pressure of the microphone; and
a first determining module, which is connected to the sound pressure detecting module and is configured to: when the sound pressure detecting module detects that $F_1-F_2 \geq F_3$, determine that the microphone is shielded, wherein $F_1$ represents sound pressure of the microphone during a first time period, $F_2$ represents sound pressure of the microphone during a second time period, and the first time period is prior to the second time period; and $F_3$ represents a first threshold.

8. The sound effect control apparatus according to claim 6, herein the control unit is configured to: when the detecting unit detects that the microphone is shielded, further perform one or more of the following operations:
improving a gain of the microphone; and
enabling a second microphone of the mobile terminal and using the second microphone as a microphone for the hands-free call.

9. The sound effect control apparatus according to claim 6, wherein:
the detecting unit comprises at least one of:
an acoustic impedance detecting module and a second determining module;
an amplitude detecting module and a third determining module; and
a delay detecting module and a fourth determining module;
the acoustic impedance detecting module is configured to detect the variation in acoustic impedance of the speaker;
the second determining module is connected to the acoustic impedance detecting module and is configured to: when the acoustic impedance detecting module detects that $R_2 -R_1 \geq R_3$, determine that the speaker is shielded, wherein $R_1$ represents acoustic impedance of the speaker at a first time, $R_2$, represents acoustic impedance of the speaker at a current time, and the first time is prior to the current time; $R_3$ represents a second threshold;
the amplitude detecting module is configured to detect an amplitude $H_1$ of the first sound and an amplitude $H_2$ of the second sound;
the third determining module is connected to the amplitude detecting module and the microphone detecting subunit, and is configured to: when the amplitude detecting module detects that $H_1-H_2 \geq H_3$ and the microphone detecting subunit determines that the microphone is not shielded, determine that the speaker is shielded, wherein $H_3$ represents a third threshold;
the delay detecting module is configured to detect a transmission delay T of the first sound relative to the second sound;
the fourth determining module is connected to the delay detecting module and is configured to: when $T \leq T_1$, determine that the speaker is shielded, wherein $T_1$ represents a fourth threshold; and the first sound is a sound that is picked up inside the mobile terminal and to be output by the speaker, and the second sound is a sound that is picked up by the microphone and that is obtained after the first sound is output by the speaker.

10. The sound effect control apparatus according to claim 9, wherein the control unit is configured to: when the detecting unit detects that the speaker is shielded, further perform any one or more of the following operations:
   raising a volume of the speaker;
   adjusting at least one of a filter parameter, an automatic gain control parameter, and an echo cancellation parameter that are of the hands-free call channel of the mobile terminal, so as to reduce at least one of a noise floor, a degree of distortion, and an echo of a sound output by the speaker; and
   enabling a second speaker of the mobile terminal and using the second speaker as a speaker for the hands-free call.

11. A mobile terminal, comprising:
   a processor; and
   a memory coupled to the processor and storing programming instructions for execution by the processor, the programming instructions instruct the processor to:
      detect whether a microphone of the mobile terminal is shielded and detect whether a speaker of the mobile terminal is shielded when a hands-free call is performed for the mobile terminal, wherein the programming instructions to detect whether the speaker of the mobile terminal is shielded comprise programming instructions to detect at least one of: a variation in acoustic impedance of the speaker, a difference in amplitude between first and second sounds, and a transmission delay between first and second sounds, and
      when it is detected that the microphone of the mobile terminal is shielded, adjust at least one of a filter parameter, an automatic gain control parameter, and an echo cancellation parameter of a hands-free call channel of the mobile terminal, so as to reduce at least one of a noise floor, a degree of distortion, and an echo of a sound picked up by the microphone.

12. The mobile terminal according to claim 11, wherein the programming instructions further instruct the processor to:
   detect a variation in sound pressure of the microphone; and
   when it is detected that $F_1 - F_2 \geq F_3$, determine that the microphone is shielded, wherein $F_1$ represents sound pressure of the microphone during a first time period, $F_2$ represents sound pressure of the microphone during a second time period, and the first time period is prior to the second time period; and $F_3$ represents a first threshold.

13. The mobile terminal according to claim 11, wherein the programming instructions further instruct the processor to:
   when it is detected that the microphone is shielded, perform one or more of the following:
   improve a gain of the microphone; and
   enable a second microphone of the mobile terminal and using the second microphone as a microphone for the hands-free call.

14. The mobile terminal according to claim 11, wherein:
   the programming instructions that instruct the processor to detect a variation in acoustic impedance of the speaker comprise programming instructions to:
      when it is detected that $R_2 - R_1 \geq R_3$, determine that the speaker is shielded, wherein $R_1$ represents acoustic impedance of the speaker at a first time, $R_2$, represents acoustic impedance of the speaker at a current time, and the first time is prior to the current time; $R_3$ represents a second threshold;
   the programming instructions that instruct the processor to detect a difference in amplitude between first and second sounds comprise programming instructions to:
      detect an amplitude $H_1$ of the first sound and an amplitude $H_2$, of the second sound; and
      when $H_1 - H_2 \geq H_3$ and it is determined that the microphone is not shielded, determine that the speaker is shielded, wherein $H_3$ represents a third threshold; and
   the programming instructions that instruct the processor to detect a transmission delay between first and second sounds comprise programming instructions to:
      detect a transmission delay T of the first sound relative to the second sound; and
      when $T \leq T_1$, determine that the speaker is shielded, wherein $T_1$ represents a fourth threshold;
   wherein the first sound is a sound that is picked up inside the mobile terminal and to be output by the speaker, and the second sound is a sound that is picked up by the microphone and that is obtained after the first sound is output by the speaker.

15. The mobile terminal according to claim 14, wherein the programming instructions further instruct the processor to:
   when it is detected that the speaker is shielded, perform any one or more of the following:
   raise a volume of the speaker;
   adjust at least one of a filter parameter, an automatic gain control parameter, and an echo cancellation parameter that are of the hands-free call channel of the mobile terminal, so as to reduce at least one of a noise floor, a degree of distortion, and an echo of a sound output by the speaker; and
   enable a second speaker of the mobile terminal and using the second speaker as a speaker for the hands-free call.

\* \* \* \* \*